(12) United States Patent
Kirkman et al.

(10) Patent No.: US 7,727,633 B2
(45) Date of Patent: Jun. 1, 2010

(54) SOLAR CONTROL GLAZING LAMINATES

(75) Inventors: Janet R. Kirkman, Minneapolis, MN (US); Peter M. Olofson, Oakdale, MN (US); Jie Yang, Woodbury, MN (US); Stephen A. Johnson, Woodbury, MN (US); Raghunath Padiyath, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 622 days.

(21) Appl. No.: 11/466,213

(22) Filed: Aug. 22, 2006

(65) Prior Publication Data

US 2008/0050579 A1   Feb. 28, 2008

(51) Int. Cl.
  B32B 17/10   (2006.01)
  B29C 65/00   (2006.01)
  B32B 37/00   (2006.01)

(52) U.S. Cl. .................. 428/437; 156/106; 428/328; 428/436

(58) Field of Classification Search .................. 156/106; 428/436, 437
See application file for complete search history.

(56) References Cited

U.S. PATENT DOCUMENTS

| | | | |
|---|---|---|---|
| 3,610,724 A | 10/1971 | Frizzell | |
| 3,711,176 A | 1/1973 | Alfrey | |
| 3,841,890 A | 10/1974 | Coaker | |
| 4,144,217 A | 3/1979 | Snelgrove | |
| 4,446,305 A | 5/1984 | Rogers | |
| 4,540,623 A | 9/1985 | Im | |
| 5,252,694 A | 10/1993 | Willett | |
| 5,448,404 A | 9/1995 | Schrenk | |
| 5,882,774 A | 3/1999 | Jonza | |
| 6,045,894 A | 4/2000 | Jonza | |
| 6,352,761 B1 | 3/2002 | Hebrink | |
| 6,531,230 B1 | 3/2003 | Weber | |
| 6,887,917 B2 | 5/2005 | Yang | |
| 6,949,297 B2 | 9/2005 | Yang | |
| 2001/0022982 A1 | 9/2001 | Neavin | |
| 2003/0161997 A1* | 8/2003 | Moran | 428/172 |
| 2004/0032658 A1 | 2/2004 | Fleming | |
| 2005/0123772 A1 | 6/2005 | Coustet et al. | |
| 2007/0188871 A1 | 8/2007 | Fleury | |

FOREIGN PATENT DOCUMENTS

| | | |
|---|---|---|
| EP | 0947477 A1 | 10/1999 |
| EP | 0860406 B1 | 12/2001 |
| WO | WO 99/39224 | 8/1999 |

* cited by examiner

*Primary Examiner*—D. S Nakarani
(74) *Attorney, Agent, or Firm*—Jeffrey M. Olofson

(57) ABSTRACT

A solar control glazing laminate may include a solar control film disposed between first and second polyvinyl butyral layers and first and second glazing substrates. The solar control film may include an infrared radiation reflecting polymeric film and a polymeric binder layer disposed on the infrared radiation reflecting polymeric film. The polymeric binder layer may include a polyester and cross-linked multi-functional acrylate segments and may have infrared radiation absorbing nanoparticles dispersed therein.

22 Claims, 1 Drawing Sheet

SOLAR CONTROL GLAZING LAMINATES

BACKGROUND

The present disclosure relates generally to solar control glazing laminates and a method of forming the same.

Solar control glazing provides comfort to passengers in, for example, a vehicle, especially in the side glass when the sun is in a location that more directly hits a passenger. Solar control glazing reduces the amount of infrared energy that transmits into, for example, a vehicle. Solar control glass is commonly used as the solar control glazing, however, because of legal limits on the transmission of windshields, backlights and sidelights, only a small portion of the solar energy is adsorbed.

Another solar control technology is metal/oxide coatings on glass. This improves solar control over the absorbing glass, but the metal coating can interfere with electro magnetic frequencies utilized with cell phones, garage door openers, radar detectors, automated toll collectors, and the like.

In addition, any solar control solution must be able to meet the bending requirements of windshields and other glazing units. These bending requirements often lead to delamination of solar control glazing laminates.

SUMMARY

In one exemplary implementation, the present disclosure is directed to a solar control glazing laminate that includes a first glazing substrate and a first polyvinyl butyral layer that is disposed on the first glazing substrate. A solar control film is disposed on the first polyvinyl butyral layer and a second polyvinyl butyral layer is disposed on the solar control film. A second glazing substrate is disposed on the second polyvinyl butyral layer.

The solar control film includes an infrared radiation reflecting polymeric film and a polymeric binder layer that is disposed on the infrared radiation reflecting polymeric film. The polymeric binder layer includes polyester and cross-linked multi-functional acrylate segments. Infrared radiation absorbing nanoparticles are dispersed within the polymeric binder layer.

In another exemplary implementation, the present disclosure is directed to a method of forming a solar control glazing laminate. A solar control film is disposed between first and second polyvinyl butyral layers. The solar control film includes an infrared radiation reflecting film and a polymeric binder layer disposed thereon. The polymeric binder layer includes polyester and cross-linked multi-functional acrylate segments and includes infrared radiation absorbing nanoparticles dispersed within the polymeric binder layer.

The first and second polyvinyl butyral layers, sandwiching the solar control film, are disposed between first and second glazing substrates. Heat and pressure are applied to form a solar control glazing laminate.

These and other aspects of the solar control glazing laminates according to the subject invention will become readily apparent to those of ordinary skill in the art from the following detailed description together with the drawings.

BRIEF DESCRIPTION OF THE DRAWINGS

So that those having ordinary skill in the art to which the subject invention pertains will more readily understand how to make and use the subject invention, exemplary embodiments thereof will be described in detail below with reference to the drawings, in which.

DETAILED DESCRIPTION

Figure 1:
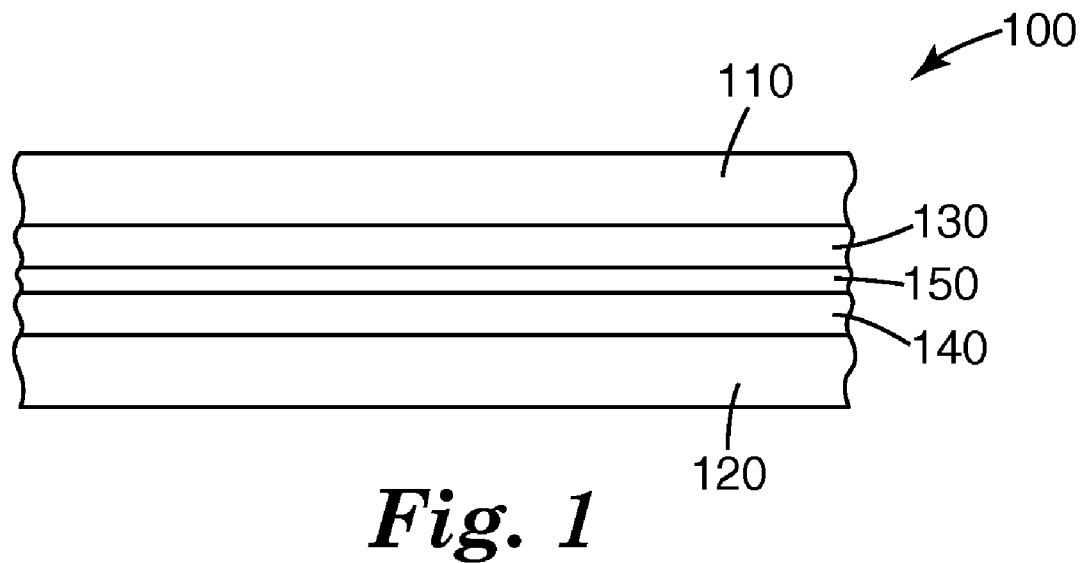
FIG. 1 is a schematic cross-sectional view of a solar control glazing laminate including a solar control film.

The following description should be read with reference to the drawings, in which like elements in different drawings are numbered in like fashion. The drawings, which are not necessarily to scale, depict selected illustrative embodiments and are not intended to limit the scope of the disclosure. Although examples of construction, dimensions, and materials are illustrated for the various elements, those skilled in the art will recognize that many of the examples provided have suitable alternatives that may be utilized.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a film" encompasses embodiments having one, two or more films. As used in this specification and the appended claims, the term "or" is generally employed in its sense including "and/or" unless the content clearly dictates otherwise.

The term "polymer" will be understood to include polymers, copolymers (e.g., polymers formed using two or more different monomers), oligomers and combinations thereof, as well as polymers, oligomers, or copolymers that can be formed in a miscible blend.

The present disclosure is directed generally to solar control glazing laminates and methods of forming the same. In particular, the present disclosure is directed to a solar control glazing laminate that includes a first glazing substrate and a first polyvinyl butyral layer that is disposed on the first glazing substrate. A solar control film is disposed on the first polyvinyl butyral layer and a second polyvinyl butyral layer is disposed on the solar control film. A second glazing substrate is disposed on the second polyvinyl butyral layer.

The solar control film includes an infrared radiation reflecting polymeric film and a polymeric binder layer that is disposed on the infrared radiation reflecting polymeric film. The polymeric binder layer includes polyester and cross-linked multi-functional acrylate segments. Infrared radiation absorbing nanoparticles are dispersed within the polymeric binder layer. While the present invention is not so limited, an appreciation of various aspects of the invention will be gained through a discussion of the examples provided below.

The solar control glazing laminates describes herein does not interfere with electro magnetic frequencies, provides the required visible light transmission for automotive glazings, provides improved solar control, and does not delaminate when subjected to bending requirements.

FIG. 1 is a schematic cross-section of a solar control glazing laminate 100. The solar control glazing laminate includes a first glazing substrate 110 and a second glazing substrate 120. In this, first and second are arbitrary and are not intended to indicate upper or lower, inside or outside or any other particular possible orientation or configuration. A first polyvinyl butyral layer 130 is disposed adjacent to the first glazing substrate 110 and a second polyvinyl butyral layer 140 is disposed adjacent to the second glazing substrate 120. A solar control film 150 is disposed between first polyvinyl butyral layer 130 and second polyvinyl butyral layer 140.

The solar control glazing laminate 100 may be formed by assembling and then laminating the individual components. The first polyvinyl butyral layer 130 may be disposed along the first glazing substrate 110. The solar control film 150 may be placed in contact with the first polyvinyl butyral layer 130. The second polyvinyl butyral layer 140 may be placed in contact with the solar control film 150, and the second glazing substrate 120 may be disposed in contact with the second polyvinyl butyral layer 140.

The solar control glazing laminate 100 may be configured to be substantially clear in appearance, having a haze value of less than 2 or even a haze value of less than 1. In some cases, the solar control glazing laminate 100 may be configured to be transparent or at least substantially transparent to visible light, having a visible light transmission of greater than 70 percent or greater than 72 percent. The solar control glazing laminate 100 may be configured to reduce the amount of solar-induced thermal energy that passes through the solar control glazing laminate 100, having a reflected energy value of greater than about 15 percent and a total solar heat transmitted value of less than about 50 percent.

Figure 2:
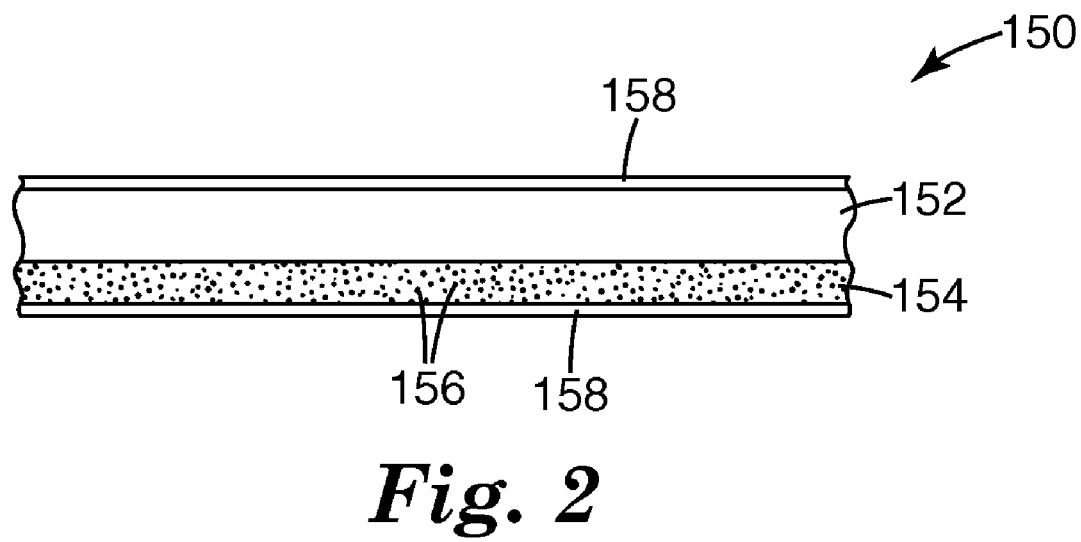
FIG. 2 is a schematic cross-sectional view of the solar control film included in FIG. 1.

FIG. 2 is a schematic cross-section of the solar control film 150. The solar control film 150 includes an infrared radiation reflecting film 152 and a polymeric binder layer 154. Infrared radiation absorbing nanoparticles 156 are disposed within the polymeric binder layer 154. In some instances, the polymeric binder layer 154 may be separately formed and then subsequently disposed along the infrared radiation reflecting film 152. In some cases, the polymeric binder layer 154 may be coated onto the infrared radiation reflecting film 152.

In some instances, as illustrated, the solar control film 150 may be subjected to a corona treatment, resulting in a thin surface treatment layer 158. In some cases, the solar control film 150 may be subjected to a nitrogen corona treatment at a rate of about 1 Joule per square centimeter. This corona treatment has been found to substantially increase the adhesion of the laminate layers such that these laminate layers do not delaminate during processing or bending requirements of automotive glazing units.

The first glazing substrate 110 and the second glazing substrate 120 may be formed of any suitable glazing material. In some instances, the glazing substrates may be selected from a material that possesses desirable optical properties at particular wavelengths including visible light. In some cases, the glazing substrates may be selected from materials that transmit substantial amounts of light within the visible spectrum. In some instances, the first glazing substrate 110 and/or the second glazing substrate 120 may each be selected from materials such as glass, quartz, sapphire, and the like. In particular instances, the first glazing substrate 110 and the second glazing substrate 120 may both be glass.

In many embodiments, the first glazing substrate 110 and a second glazing substrate 120 are formed of the same material and posses the same, similar, or substantially similar physical, optical, or solar control properties. For example, the first glazing substrate 110 and a second glazing substrate 120 can both be formed of either clear glass or green tint glass. In some embodiments, the first glazing substrate 110 and a second glazing substrate 120 are formed of the different material and posses the different physical, optical, or solar control properties. For example, the first glazing substrate 110 can be formed of clear glass and a second glazing substrate 120 can both be formed of green tint glass.

The first glazing substrate 110 and the second glazing substrate 120 may be either planar or non-planar. Planar glazing substrates may be used if, for example, the solar control glazing laminate 110 is intended as a window glazing unit. Vehicular uses such as automotive windshields, side windows and rear windows may suggest the use of non-planar glazing substrates. If desired, and depending on the intended use of the solar control glazing laminate 100, the first glazing substrate 110 and/or the second glazing substrate 120 may include additional components such as tints, scratch-resistant coatings, and the like.

As discussed above, the solar control glazing laminate 100 includes a first polyvinyl butyral layer 130 and a second polyvinyl butyral layer 140. Each of the first polyvinyl butyral layer 130 and the second polyvinyl butyral layer 140 may be formed via known aqueous or solvent-based acetalization process in which polyvinyl alcohol is reacted with butyraldehyde in the presence of an acidic catalyst. In some instances, the first polyvinyl butyral layer 130 and/or the second polyvinyl butyral layer 140 may include or be formed from polyvinyl butyral that is commercially available from Solutia Incorporated, of St. Louis Mo., under the trade name BUTVAR® resin.

In some instances, the first polyvinyl butyral layer 130 and/or the second polyvinyl butyral layer 140 may be produced by mixing resin and (optionally) plasticizer and extruding the mixed formulation through a sheet die. If a plasticizer is included, the polyvinyl butyral resin may include about 20 to 80 or perhaps about 25 to 60 parts of plasticizer per hundred parts of resin.

Examples of suitable plasticizers include esters of a polybasic acid or a polyhydric alcohol. Suitable plasticizers are triethylene glycol bis(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217.

As discussed above with respect to FIG. 2, the solar control film 150 includes an infrared radiation reflecting film 152 and a polymeric binder layer 154. In many embodiments, the infrared radiation reflecting film 152 is a multilayer optical film. The layers have different refractive index characteristics so that some light is reflected at interfaces between adjacent layers. The layers are sufficiently thin so that light reflected at a plurality of the interfaces undergoes constructive or destructive interference in order to give the film the desired reflective or transmissive properties. For optical films designed to reflect light at ultraviolet, visible, near-infrared, or infrared wavelengths, each layer generally has an optical thickness (i.e., a physical thickness multiplied by refractive index) of less than about 1 micrometer. Thicker layers can, however, also be included, such as skin layers at the outer surfaces of the film, or protective boundary layers disposed within the film that separate packets of layers.

The reflective and transmissive properties of the infrared radiation reflecting film 152 are a function of the refractive indices of the respective layers (i.e., microlayers). Each layer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. In practice, the refractive indices are controlled by judicious materials selection and processing conditions. The infrared radiation reflecting film 152 can be made by co-extrusion of typically tens or hundreds of layers of two alternating polymers A, B, followed by optionally passing the multilayer extrudate through one or more multiplication dies, and then stretching or otherwise orienting the extrudate to form a final film. The resulting film is composed of typically tens or hundreds of individual layers whose thicknesses and refractive indices are tailored to provide one or more reflection bands in desired region(s) of the spectrum, such as in the visible, near infrared, and/or infrared. In order to achieve high reflectivities with a reasonable number of layers, adjacent layers preferably exhibit a difference in refractive index ($\Delta n_x$) for light polarized along the x-axis of at least 0.05. In some embodiments, if the high reflectivity is desired for two orthogonal polarizations, then the adjacent layers also exhibit a difference in refractive index ($\Delta n_y$) for light polarized along the y-axis of at least 0.05. In other embodiments, the refractive index difference $\Delta n_y$ can be less than 0.05 or 0 to produce a multilayer stack that reflects normally incident light of one polarization state and transmits normally incident light of an orthogonal polarization state.

If desired, the refractive index difference ($\Delta n_z$) between adjacent layers for light polarized along the z-axis can also be tailored to achieve desirable reflectivity properties for the p-polarization component of obliquely incident light. For ease of explanation, at any point of interest on a multilayer optical film the x-axis will be considered to be oriented within the plane of the film such that the magnitude of $\Delta n_x$ is a maximum. Hence, the magnitude of $\Delta n_y$ can be equal to or less than (but not greater than) the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1, 2 are chosen so that $n_{1x} \geq n_{2x}$, i.e., $\Delta n_x \geq 0$.

To maintain high reflectivity of p-polarized light at oblique angles of incidence, the z-index mismatch $\Delta n_z$ between layers can be controlled to be substantially less than the maximum in-plane refractive index difference $\Delta n_x$, such that $\Delta n_z \leq 0.5 * \Delta n_x$. More preferably, $\Delta n_z \leq 0.25 * \Delta n_x$. A zero or near zero magnitude z-index mismatch yields interfaces between layers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

Multilayer optical films have been described in, for example, U.S. Pat. No. 3,610,724 (Rogers); U.S. Pat. No. 3,711,176 (Alfrey, Jr. et al.), "Highly Reflective Thermoplastic Optical Bodies For Infrared, Visible or Ultraviolet Light"; U.S. Pat. No. 4,446,305 (Rogers et al.); U.S. Pat. No. 4,540,623 (Im et al.); U.S. Pat. No. 5,448,404 (Schrenk et al.); U.S. Pat. No. 5,882,774 (Jonza et al.) "Optical Film"; U.S. Pat. No. 6,045,894 (Jonza et al.) "Clear to Colored Security Film"; U.S. Pat. No. 6,531,230 (Weber et al.) "Color Shifting Film"; PCT Publication WO 99/39224 (Ouderkirk et al.) "Infrared Interference Filter"; and US Patent Publication 2001/0022982 A1 (Neavin et al.), "Apparatus For Making Multi-layer Optical Films", all of which are incorporated herein by reference. In such polymeric multilayer optical films, polymer materials are used predominantly or exclusively in the makeup of the individual layers. Such films can be compatible with high volume manufacturing processes, and may be made in large sheets and roll goods.

The infrared radiation reflecting film 152 can be formed by any useful combination of alternating polymer type layers. In many embodiments, at least one of the alternating polymer layers is birefringent and oriented. In some embodiments, one of the alternating polymer layer is birefringent and orientated and the other alternating polymer layer is isotropic. In one embodiment, the multilayer optical film is formed by alternating layers of a first polymer type including polyethylene terephthalate (PET) or copolymer of polyethylene terephthalate (coPET) and a second polymer type including poly(methyl methacrylate) (PMMA) or a copolymer of poly(methyl methacrylate) (coPMMA). In another embodiment, the multilayer optical film is formed by alternating layers of a first polymer type including polyethylene terephthalate and a second polymer type including a copolymer of poly(methyl methacrylate and ethyl acrylate). In another embodiment, the multilayer optical film is formed by alternating layers of a first polymer type including cyclohexanedimethanol (PETG) or a copolymer of cyclohexanedimethanol (coPETG) and second polymer type including polyethylene naphthalate (PEN) or a copolymer of polyethylene naphthalate (coPEN). In another embodiment, the multilayer optical film is formed by alternating layers of a first polymer type including polyethylene naphthalate or a copolymer of polyethylene naphthalate and a second polymer type including poly(methyl methacrylate) or a copolymer of poly(methyl methacrylate). Useful combination of alternating polymer type layers are disclosed in U.S. Pat. No. 6,352,761, which is incorporated by reference herein.

As discussed above with respect to FIG. 2, the solar control film 150 also includes a polymeric binder layer 154. In many embodiments, the polymeric binder layer 154 may include both polyester and multi-functional acrylate, curable acrylate, and/or acrylate/epoxy materials.

It has been found that the inclusion of a multi-functional acrylate, curable acrylate, and/or acrylate/epoxy material reduces plasticizer migration from the infrared radiation reflecting film 152 to the polymeric binder layer 154. Preventing this plasticizer migration improves (i.e., decreases) the haze value of the solar control glazing laminate 100.

Polyesters that are suitable for use in forming the polymeric binder layer 154 may include carboxylate and glycol subunits and may be generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. Also included within the term "polyester" are polycarbonates derived from the reaction of glycol monomer molecules with esters of carbonic acid.

Suitable carboxylate monomer molecules include, for example, 2,6-naphthalene dicarboxylic acid and isomers thereof; terephthalic acid; isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof; t-butyl isophthalic acid, trimellitic acid, sodium sulfonated isophthalic acid; 2,2'-biphenyl dicarboxylic acid and isomers thereof; and lower alkyl ($C_{1-10}$ linear or branched) esters of these acids, such as methyl or ethyl esters.

Suitable glycol monomer molecules include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy)benzene.

A useful polyester is polyethylene terephthalate (PET). A PET having an inherent viscosity of 0.74 dL/g is available from Eastman Chemical Company of Kingsport, Tenn. A useful PET having an inherent viscosity of 0.854 dL/g is available from E. I. DuPont de Nemours & Co., Inc.

The polymeric binder layer 154 also includes multi-functional acrylate segments. Specific examples include those prepared from free-radically polymerizable acrylate monomers or oligomers such as described in U.S. Pat. No. 5,252,694 at col. 5, lines 35-68, and U.S. Pat. No. 6,887,917, col. 3, line 61 to col. 6, line 42, which are incorporated by reference herein.

The polymeric binder layer 154 can also include curable acrylate and acrylate/epoxy material, such as those described in U.S. Pat. No. 6,887,917 and U.S. Pat. No. 6,949,297, which are incorporated by reference herein.

The polymeric binder layer 154 includes infrared radiation absorbing nanoparticles 156 dispersed through the polymeric binder layer 154. The infrared radiation absorbing nanoparticles may include any material that preferentially absorbs infrared radiation. Examples of suitable materials include metal oxides such as tin, antimony, indium and zinc oxides and doped oxides.

In some instances, the metal oxide nanoparticles include, tin oxide, antimony oxide, indium oxide, indium doped tin oxide, antimony doped indium tin oxide, antinomy tin oxide, antimony doped tin oxide or mixtures thereof. In some embodiments, the metal oxide nanoparticles include antimony oxide (ATO) and/or indium tin oxide (ITO). In some cases, the infrared radiation absorbing nanoparticles may include or be made of lanthanum hexaboride, or $LaB_6$.

Lanthanum hexaboride is an effective near IR (NIR) absorber, with an absorption band centered on 900 nm. The infrared radiation absorbing nanoparticles 156 can be sized such that they do not materially impact the visible light transmission of the polymeric binder layer 154. In some instances, the infrared radiation absorbing nanoparticles 156 may have any useful size such as, for example, 1 to 100, or 30 to 100, or 30 to 75 nanometers.

The present invention should not be considered limited to the particular examples described herein, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Test Methods

The haze of each sample was measured following ASTM-D1003, using a Haze Guard Plus Haze meter (available from BYK-Gardner, Columbia Md.), prior to and after lamination. The visible transmission (Tvis according to ANSI-Z26), reflected energy (Re according to ISO-9050) and total solar heat transmitted (TSHT according to ISO-9050) were measured using a Perkin Elmer Lambda 19 Spectrophotometer. Compressive shear of laminated samples was also tested using an Instron Tensile tester configured to shear a laminated sample mounted at 45 degrees to the compressive force.

Example 1

A coating solution was prepared by combining KHF-7A (a solution of lanthanum hexaboride nanoparticles available from Sumitomo Metal Mining, Osaka, Japan), with Vitel 2200 (a PET binder available from Bostik, Inc., Middleton Mass.), Actilane 420 (an multi-functional acrylate available from Akzo Nobel, New Brunswick N.J.) and Irgaure 651 (a photoinitiator available from Ciba Geigy, Greensborough N.C.) in the following weight percentages: MEK (54%), Vitel 2200 (16%), KHF-7A (22%), Actilane 420 (7%), Irgacure 651 (1%).

This combination was then mixed in a roller mill for approximately 1 hour, and then coated on Solar Reflecting Film 1200 (available from 3M Company, St. Paul Minn.) using a meyer rod resulting in a dry thickness of 0.35 mils (9 micrometers). The samples were oven dried at 70° C. for approximately 10 minutes and then UV cured at 67 feet/minute using a Fusion Systems processor (UV Systems Inc. Gaithersberg, Md.) fitted with a D-bulb. The sample was then nitrogen corona treated at 1.0 $J/cm^2$ to improve adhesion of the laminate.

A laminated stack was prepared by sandwiching a coated film sample between 2 sheets of 0.38 mm Saflex RK 11 (or BUTVAR) PVB (polyvinylbutyral available from Solutia, St. Louis Mo.), and then placing the sandwich between 2 pieces of 2.0 mm clear glass (available from PPG). The laminated stack was then heated to 90° C. for 15 minutes, and then nip rolled to remove air. They were then autoclaved (autoclave available from Lorimer Corporation) in the following cycle: ramp from 0 psig and 21° C. (70° F.) to 140 psig and 138° C. (280° F.) in 25 minutes, hold for 30 minutes, cool to 38° C. (100° F.) in 40 minutes using an external fan, vent pressure to 0 psig.

Comparative Example 1

A sample was prepared in the same manner as that discussed with respect to Example 1, except that no corona treatment was applied.

Table 1 lists both films (before lamination) and laminate haze values, as well as providing compressive shear values. It can be seen that corona treatment provides a significant increase in adhesion, as indicated by a significant difference in compressive shear. Table 2 lists optical properties for Example 1.

TABLE 1

| Sample | Film Haze (%) | Laminate Haze (%) | Compressive Shear (psi) |
|---|---|---|---|
| Example 1 | 0.9 | 0.8 | 1950 |
| Comparative Example 1 | 0.7 | 0.8 | 1160 |

TABLE 2

| | Laminate Optical Properties | | |
|---|---|---|---|
| Sample | Tvis (%) | Re (%) | TSHT (%) |
| Example 1 | 73.3 | 20.2 | 54.2 |

Example 2

Two pieces of 2.1 mm thick green tint glass (available from PPG) and 0.76 mm RK11 PVB were laminated together using the lamination process described in Example 1. The visible transmission (Tvis), reflected energy (Re) and total solar heat transmitted (TSHT) of laminated samples were measured. The results are in the table below.

TABLE 4

| | Laminate Optical Properties | | |
|---|---|---|---|
| Sample | Tvis (%) | Re (%) | TSHT (%) |
| Example 2 Tint/PVB/Tint | 77.9 | 5.8 | 56.5 |

Comparative Example 2

A solution was prepared in the same manner as Example 1, with the following differences: the materials in the coating solution were KHF-7A (13%), Vitel 2200 (22%) and MEK (65%), the resulting dry coating thickness was 0.15 mils (4 micrometers), and no UV curing was required (since the multi-functional acrylate was not present). The laminated stack was prepared, and the haze measured as in Example 1.

TABLE 5

| | Film and Laminate Haze without UV Cured Acrylate | |
|---|---|---|
| Sample | Film Haze (%) | Laminate Haze (%) |
| Comparative 2 | 1.3 | 2.3 |

The present disclosure should not be considered limited to the particular examples described above, but rather should be understood to cover all aspects of the disclosure as fairly set out in the attached claims. Various modifications, equivalent processes, as well as numerous structures to which the present invention may be applicable will be readily apparent to those of skill in the art to which the present invention is directed upon review of the instant specification.

We claim:

1. A solar control glazing laminate comprising:
   a first glazing substrate;
   a first polyvinyl butyral layer disposed on the first glazing substrate;
   a solar control film disposed on the first polyvinyl butyral layer;
   a second polyvinyl butyral layer disposed on the solar control film; and
   a second glazing substrate disposed on the second polyvinyl butyral layer;
   wherein the solar control film comprises an infrared radiation reflecting polymeric film and a polymeric binder layer disposed on the infrared radiation reflecting polymeric film, the polymeric binder layer comprising a polyester and cross-linked multi-functional acrylate segments and having infrared radiation absorbing nanoparticles dispersed therein.

2. A solar control glazing laminate according to claim 1 wherein the first glazing substrate comprises glass and the second glazing substrate comprises glass.

3. A solar control glazing laminate according to claim 1 wherein the first glazing substrate and the second glazing substrate have different solar control properties.

4. A solar control glazing laminate according to claim 1 wherein the first glazing substrate comprises clear glass and the second glazing substrate comprises green tint glass.

5. A solar control glazing laminate according to claim 1 wherein the polyester comprises a polyethylene terephthalate or a copolymer of polyethylene terephthalate.

6. A solar control glazing laminate according to claim 1 wherein the solar control glazing laminate has a haze value of less than 2.

7. A solar control glazing laminate according to claim 1 wherein the solar control glazing laminate has a haze value of less than 1.

8. A solar control glazing laminate according to claim 1 wherein the solar control glazing laminate has a visible light transmission of greater than 70%.

9. A solar control glazing laminate according to claim 1 wherein the solar control glazing laminate has a reflected energy value of greater than 15%.

10. A solar control glazing laminate according to claim 1 wherein the solar control glazing laminate has a total solar heat transmitted value of less than 50%.

11. A solar control glazing laminate according to claim 1 wherein the infrared absorbing nanoparticles comprise lanthanum hexaboride, antimony tin oxide or indium tin oxide.

12. A solar control glazing laminate according to claim 1 wherein the cross-linked multi-functional acrylate segments comprise a difunctional acrylate.

13. A solar control glazing laminate according to claim 1 wherein the infrared radiation reflecting polymeric film comprises a multilayer polymeric film, the multilayer polymeric film comprising a plurality of alternating polymeric layers of a first polymer material and a second polymer material and at least one of the alternating layers is birefringent and orientated and the alternating polymeric layers cooperate to reflect infrared radiation.

14. A solar control glazing laminate according to claim 13 wherein the first polymer material comprises polyethylene terephthalate or a copolymer of polyethylene terephthalate or polyethylene naphthalate or a copolymer of polyethylene naphthalate.

15. A method of forming a solar control glazing laminate comprising:
   disposing a solar control film between first and second polyvinyl butyral layers, the solar control film comprising an infrared radiation reflecting film and a polymeric binder layer disposed thereon, the polymeric binder layer comprising a polyester and cross-linked multi-functional acrylate segments, the polymeric binder layer having infrared radiation absorbing nanoparticles dispersed therein;
   disposing the first and second polyvinyl butyral layers between first and second glazing substrates; and
   applying heat and pressure to form the solar control glazing laminate.

16. A method according to claim 15 wherein providing a solar control film comprises providing an infrared radiation reflecting film; and coating a polymeric binder layer comprising a polyester, cross-linked multi-functional acrylate segments, and infrared radiation absorbing nanoparticles onto the infrared radiation reflecting film.

17. A method according to claim 15 wherein the first glazing substrate is glass and the second glazing substrate is glass.

18. A method according to claim 15 further comprising corona treating the solar control film before disposing the first and second polyvinyl butyral layers between first and second glazing substrates.

19. A method according to claim 15 wherein the solar control glazing laminate has a haze value of less than 1.

20. A method according to claim 15 wherein the infrared absorbing nanoparticles comprise lanthanum hexaboride, antimony tin oxide or indium tin oxide.

21. A method according to claim 15 wherein the cross-linked multi-functional acrylate segments comprise difunctional acrylate and the polyester comprises a polyethylene terephthalate or a copolymer of polyethylene terephthalate.

22. A method according to claim 15 wherein the infrared radiation reflecting polymeric film comprises a multilayer polymeric film, the multilayer polymeric film comprising a plurality of alternating polymeric layers of a first polymer material and a second polymer material and at least one of the alternating layers is birefringent and orientated and the alternating polymeric layers cooperate to reflect infrared radiation.

* * * * *